Feb. 13, 1940.                M. HANS                  2,190,328
                 GRILLE AND FENDER GUARD FOR AUTOMOBILES
                          Filed July 25, 1938
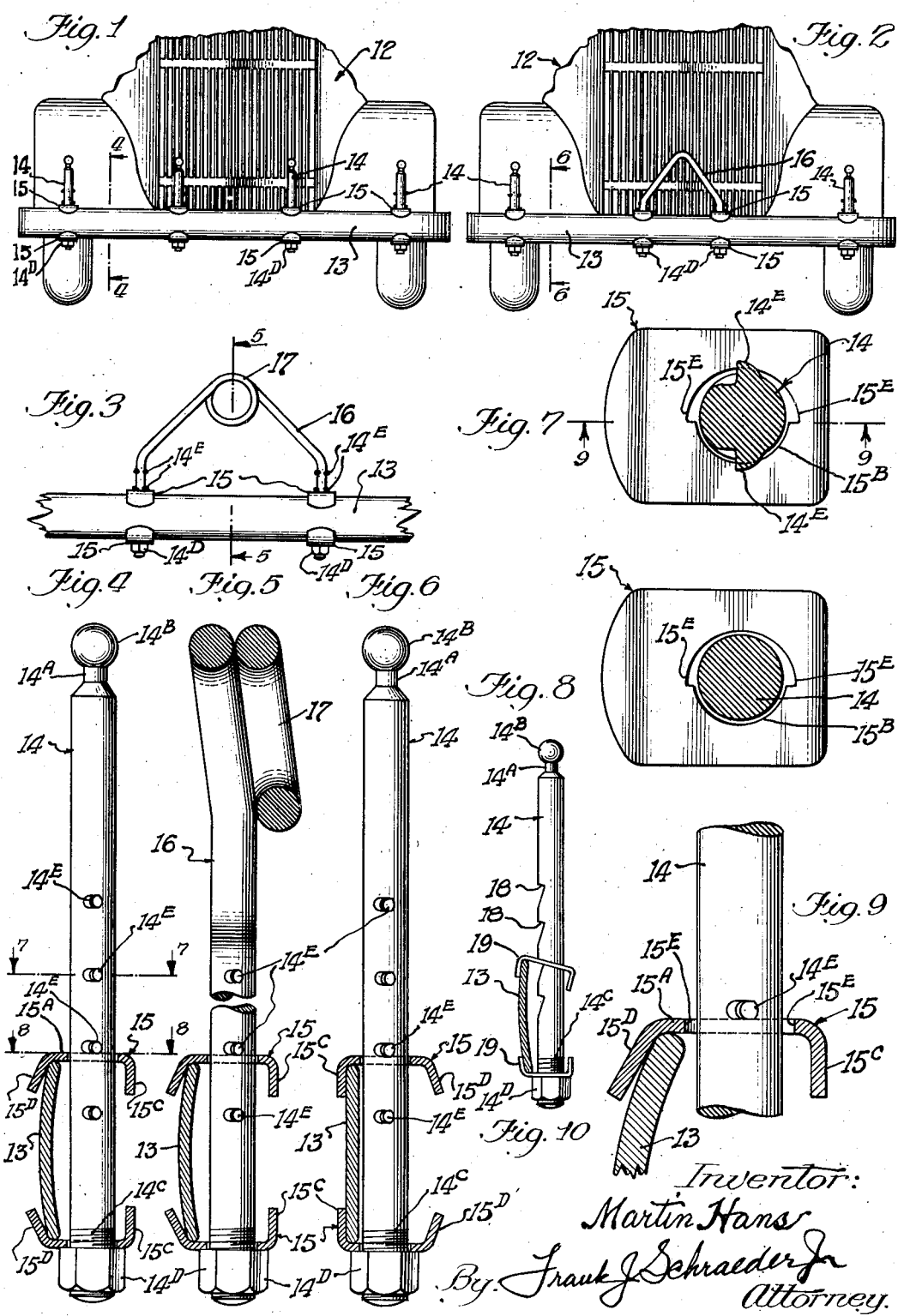
Inventor:
Martin Hans
By Frank J. Schraeder Jr.
Attorney.

Patented Feb. 13, 1940

2,190,328

UNITED STATES PATENT OFFICE 2,190,328

GRILLE AND FENDER GUARD FOR AUTOMOBILES

Martin Hans, Berwyn, Ill.

Application July 25, 1938, Serial No. 221,257

6 Claims. (Cl. 293—55)

This invention is directed to new and useful improvements in grille and fender guards for automobiles and has particular reference to guard structures adapted to be securely and adjustably mounted on the front bumper of an automobile for purposes of protecting the radiator grille and fenders.

Due to the existing variations in the distance or height of the automobile bumpers above the ground damages often result to the automobile wheel fenders or radiator grille guard when two automobiles collide. It is therefore an object of my invention to provide novel fender and grille guards which can be readily attached to the automobile bumper without the necessity of drilling holes in the bumper and which guards are of a substantially sturdy construction to withstand the usual normal shocks and provided with simple effective securing means.

Another object of my invention resides in the provision of guards of this character of simplified construction and a minimum of necessary parts.

With the above and other objects in view which will become readily apparent from the perusal of the following specification and attached drawing, my invention consists in the novel combination, construction and arrangement of the parts and members shown in preferred embodiment in the attached drawing, described in the following specification and particularly pointed out in the appended claims.

In the drawing:

Fig. 1 is a front elevation of an automobile showing my improved wheel fender and radiator grille guards;

Fig. 2 is a front elevation of an automobile similar to that shown in Fig. 1, but with a modified radiator grille guard;

Fig. 3 is a front elevation of a portion of a bumper showing a modified design for the radiator grille guard;

Fig. 4 is an enlarged cross-section of the bumper taken on line 4—4 of Fig. 1 showing an arcuate bumper member and elevation of one of my improved guards;

Fig. 5 is a vertical section taken on line 5—5 of Fig. 3;

Fig. 6 is a vertical section taken on line 6—6 of Fig. 2 showing a cross-section of a rectangular bumper and my improved guard;

Fig. 7 is an enlarged horizontal section taken on line 7—7 of Fig. 4 showing in plan view one of the retainers and the upset abutments on the guard;

Fig. 8 is an enlarged horizontal section taken on line 8—8 of Fig. 4 and showing a plan view of one of the retainers and the opening therein to by-pass the abutments of the guard;

Fig. 9 is an elevational view of the guard and the upper one of the retainers in cross-section in retaining position or engagement with a stop or upset portion of the guard, and Fig. 10 is a cross-section through a bumper showing a modified form of my invention.

Referring particularly to Figs. 1, 4, and 6 to 9 inclusive, the partial front elevation of an automobile is indicated by 12 and the front bumper by 13. The wheel fender and radiator grille guard is generally indicated by 14.

The guard 14 consists of a vertically disposed bar or rod of preferably round cross-section, preferably formed with a neck of decreased diameter 14$^A$ and the spherical head 14$^B$ at its upper end. The lower end is threaded as at 14$^C$ to receive the tightening or securing nut 14$^D$. As clearly shown in Figs. 1, 4, 6 and 9 the guard rods 14 are adapted to be secured to the bumper 13 in suitably spaced positions thereto to extend above the bumper for the puropses of protecting the wheel fenders as well as the radiator grille. It will also be noted that the vertical guards 14 are positioned on the rear or inside face of the bumper 13 and rigidly secured to the bumper by means of a pair of retainers 15 of like design and cross-section but reversedly or oppositely disposed one to the other to thereby constitute rigid retainers positioned one on the upper edge of the bumper 13 and the other on the lower edge of the bumper 13.

Each of the guard retainers consists of a short flat bar bent to provide a central horizontal portion 15$^A$, having a perforation 15$^B$, a substantially vertically bent end portion 15$^C$ and an inclined end portion 15$^D$ bent angularly to the vertical center line of the guard 14.

Since many of the bumpers 13 now used are of arcuate cross-section as shown in Figs. 4, 5 and 9, the guard retainers 15 are therefore provided with the inclined ends 15$^D$ for engagement therebetween of such arcuate bumpers; if, however, the guards are to be mounted on a bumper of substantially rectangular cross-section, the guard retainers 15 are preferably reversedly positioned relatively to the bumper so as to engage such bumper between the vertically disposed ends 15$^C$ as shown in Fig. 6.

Each guard rod 14 is provided with suitably spaced abutments 14$^E$ to accommodate its attachment to bumpers of varying widths. One or several of such abutments 14E may be spaced vertically of the rod 14. I have preferred to show pairs of laterally aligned vertically spaced pressed-out deformations 14E which constitute the spaced abutments for retainment of the upper retainer 15 when the lower retainer 15 is secured into retaining position by the nut 14D which functions as an abutment at the lower end of the guard 14. It is readily apparent that when the guard 14 is mounted on the bumper 13, as shown in Figs. 1, 2, 4, 5, 6 and 9, the upper retainer 15 will be positively held against movement relatively to the guard rod 14 by one of the abutments 14E formed integrally with or on the guard rod 14 and which abutment 14E is fixed as to movement relatively to the guard rod 14. The lower retainer 15 being free to move up and down on the guard rod 14 is adapted to be moved against the lower edge of the bumper by the tightening movement of the abutment nut 14D. It is now readily apparent that the guard 14 is not frictionally or clampingly secured to the bumper 13 but the guard 14 is held against vertical displacement relatively to the bumper 13 by means of a pair of retainers 15 and a pair of abutments, one of which is the abutment 14E which is on the rod 14 and fixed against movement relatively to the guard rod 14 and the other of which abutments is the nut 14D which is movable relatively to the guard rod 14. The retainers 15 are held between the abutments 14E and 14D and the bumper 13.

The guard 14 is also held against lateral displacement relatively to the bumper 13 by means of the retainers 15 which extend partly over the outer face of the bumper 13 while the guard rod 14 is positioned close to the inner face of the bumper 13.

The perforation 15B is preferably of the section as that of the guard rod 14 which in the present form is of round cross-section but such perforation 15B is enlarged at diametrically opposite points, as at 15E, to by-pass therethrough the two laterally aligned deformations 14E of guard rod 14 to permit relatively vertical adjustment of the upper retainer against the proper set of such abutments 14E in accordance with the width of the bumper 13 to which the guard 14 is to be attached.

When the rod 14 and retainers 15 are properly positioned relatively vertically to the bumper 13, the rod 14 is preferably turned about 90 degrees to proper abutment position as indicated in Fig. 7.

Instead of using two separate spaced vertical guards 14 for the radiator grille protection, as shown in Fig. 1, the two separate rods 14 may be formed in one piece as indicated in the inverted V-shaped grille guard 16 shown in Fig. 2 wherein the lower vertical ends are of similar construction to those of the single guard rods 14 and are provided with the same retainers 15 and abutment nuts 14D.

A modification of the inverted V-shaped grille guard 16 is shown in Fig. 3 wherein the apex 17 is of circular loop form to thereby increase the effective contact area of the guard and to provide a closed connection for one end of a tow rope and to enhance the artistic effect of such grille guard.

Another modification of my guard is shown in Fig. 10 wherein the guard rod 14 is provided with a plurality of vertically spaced and vertically aligned abutments 18 formed by under-cutting of the rod 14 and which abutments are adapted to be selectively engaged by the upper face of the upper one of the retainers 19 which are of similar construction to the retainers 15 except that the perforations in these retainers may in this instance be perfectly round but the perforations in the upper retainer may be of slightly or suitably larger diameter than that of the rod 14 to thereby permit the upper retainer 19 to be tilted into abutment position against the selected one of the abutments 18.

It will now be readily apparent that I have not only provided novel grille and fender guards of simple construction and low cost of manufacture, but the means of securement of such guards onto the automobile bumper is such that these guards, by virtue of the positive adjustable abutments provided, cannot be readily displaced from their position on the bumper by vibration and that they can withstand considerable impact before even slight displacement.

I claim:

1. An automobile radiator grille or wheel fender guard adapted to be secured to a horizontal member of an automobile bumper comprising a single rigid rod of round cross-section extending above the top of said bumper horizontal member, said rod having a plurality of vertically spaced pairs of integral projections constituting spaced upper abutments and a lower threaded end portion carrying a nut constituting an adjustable lower abutment, a pair of vertically spaced retainers positioned to engage the upper and lower edges of the bumper horizontal member, each of said retainers comprising a bar having an angularly bent end adapted to engage a face of said bumper member and having a horizontal portion provided with an opening therein, said opening being enlarged at spaced points of its periphery to permit passage therethrough of said pairs of rod projections, the upper one of said retainers being disposed in abutment with one of said pairs of projections and the lower one of said retainers being disposed in abutment with said nut.

2. An automobile radiator grille guard adapted to be secured to a horizontal member of an automobile bumper comprising a single rigid rod having a central portion of inverted V-shaped form and vertically disposed end portions adapted to be attached to said bumper horizontal member, each of said rod end portions having an upper abutment comprising a pair of spaced laterally aligned up-set portions formed integrally with said rod and extending beyond the face of said rod and a lower vertically adjustable abutment carried on the lower end thereof, and a pair of vertically spaced retainers mounted on each of said rod end portions and adapted to engage the upper and lower edges of said bumper horizontal member, the upper one of said retainers being held against upward displacement by said upper abutment and being provided with a perforation through which said rod extends, said perforation being enlarged at spaced portions to permit passage of said spaced abutment portions therethrough, and the lower one of said retainers being held against downward displacement by said lower adjustable abutment.

3. An automobile radiator grille guard as embodied in claim 2, and including screw threads on the lower end of said rod, and said lower abutment comprising a threaded nut mounted on the threaded rod end.

4. An automobile guard as embodied in claim 2 and including the apex portion of said central V-shaped portion being looped.

5. An automobile radiator grille or wheel fender guard adapted to be secured to a horizontal member of an automobile bumper, comprising a single rigid rod extending above said bumper horizontal member, said rod having an upper abutment consisting of a pair of spaced laterally aligned up-set portions formed integrally with said rod and extending beyond the face of said rod, a lower abutment mounted for relative movement at the lower end of said rod, and a pair of vertically spaced retainers positioned to engage the upper and lower edges of said bumper horizontal member, the upper one of said retainers being held against upward displacement by said upper abutment and being provided with a perforation through which said rod extends, said perforation being enlarged in spaced portions to permit passage of said spaced abutment portions therethrough, and the lower of said retainers being held against downward displacement by said lower abutment.

6. An automobile radiator grille or wheel fender guard adapted to be secured to a horizontal member of an automobile bumper, comprising a single rigid rod extending above said bumper horizontal member, said rod having screw threads at its lower end and having an upper abutment consisting of a pair of spaced laterally aligned up-set portions formed integrally with said rod and extending beyond the face of said rod, a lower abutment nut mounted for relative movement on said threads at the lower end of said rod, and a pair of vertically spaced retainers positioned to engage the upper and lower edges of said bumper horizontal member, the upper one of said retainers being held against upper displacement by said upper abutment and being provided with a perforation through which said rod extends, said perforation being enlarged in spaced portions to permit passage of said spaced abutment portions therethrough, and the lower of said retainers being held against downward displacement by said lower abutment nut.

MARTIN HANS.